UNITED STATES PATENT OFFICE.

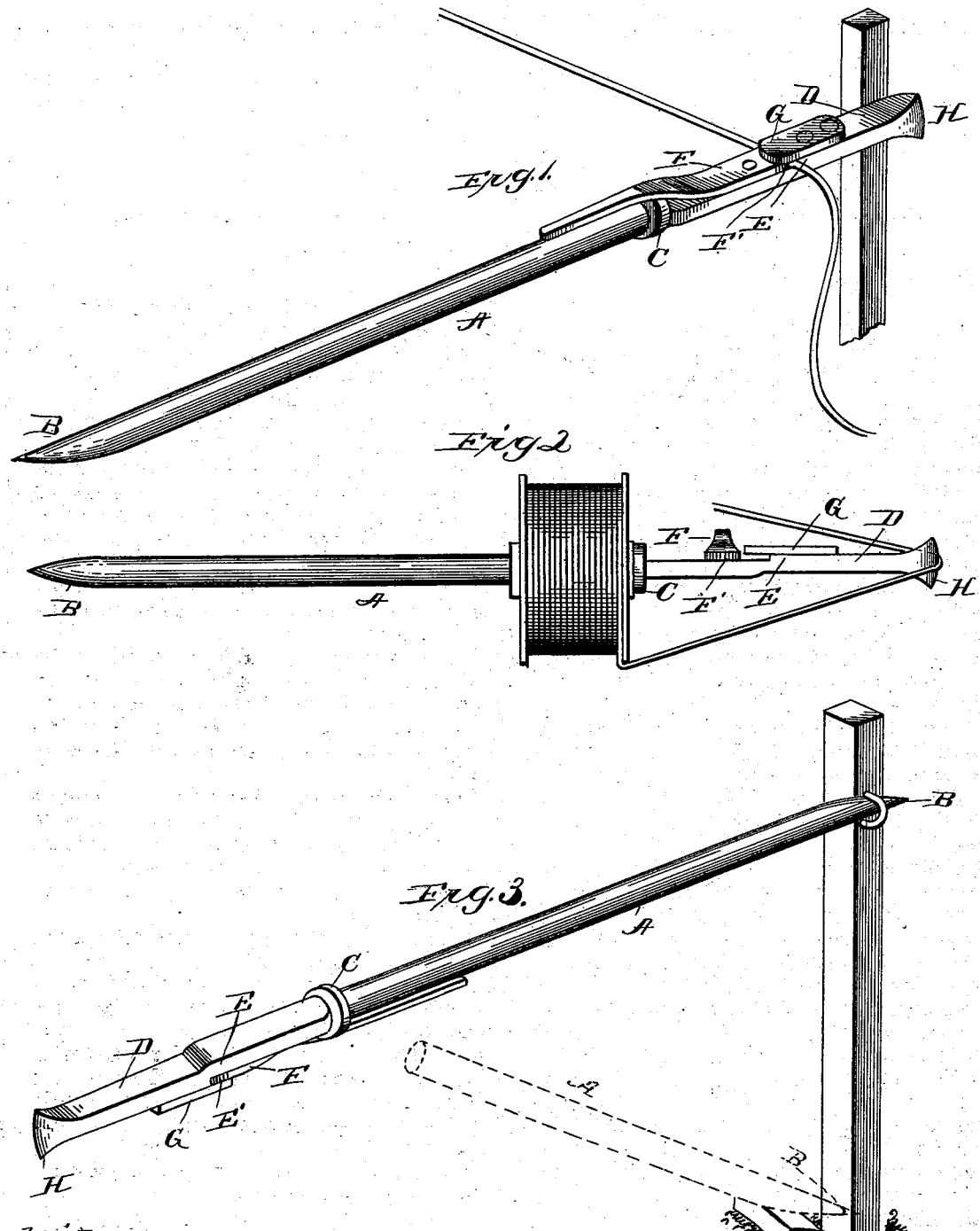

GEORGE WILLIAM BURNS, OF THOMPSONVILLE, ILLINOIS.

FENCING-TOOL.

SPECIFICATION forming part of Letters Patent No. 506,155, dated October 3, 1893.

Application filed July 5, 1893. Serial No. 479,589. (No model.)

*To all whom it may concern:*

Be it known that I, GEORGE WILLIAM BURNS, of Thompsonville, in the county of Franklin and State of Illinois, have invented certain new and useful Improvements in Fencing-Tools; and I do hereby declare the following to be a full, clear, and exact description of the invention, such as will enable others skilled in the art to which it pertains to make and use it, reference being had to the accompanying drawings, which form part of this specification.

My invention relates to an improvement in fencing tools, and it consists in the novel features of construction hereinafter fully described, whereby the same is adapted for several uses during the operation of building a wire fence.

Referring to the accompanying drawings: Figure 1, is a perspective view of my improved tool showing it in position when being used as a wire stretcher. Fig. 2, is a similar view showing the wire spool thereon for the purpose of being carried, also the wire passed over the chisel end of the tool for the purpose of being severed. Fig. 3, is a similar view showing the implement in position for extracting staples. In the same view is shown in dotted lines, the implement in position for lifting the post from the ground.

A designates a bar which is preferably round in form having at one end and at one side of its longitudinal axis the sharpened point B. At the opposite end of the rounded portion is the collar C, and beyond this extends the angular bar portion D having formed therein the offset E. Adjacent to this offset is pivoted the wire locking lever F, the ratchet end F' of which is adapted to close quite near the said offset E, and thus clamp the wire firmly thereto, thereby securing a tight grasp and thus enabling the wire to be effectually stretched. A projecting strip G extends over the offset portion and the short end of said lever, for the purpose of confining the wire in place while being clamped by the said locking lever. The outer end of the bar portion D is formed into a chisel H over which the wire may be passed, as shown in Fig. 2, for the purpose of cutting or severing it which may be effected by a blow from a hammer.

The bar A is made rounded for the purpose of conveniently carrying the wire thereon as shown in Fig. 2, and the collar C is provided to prevent the spool from running up upon the locking lever, as will be readily understood. The spool may thus be conveniently carried from place to place without material inconvenience.

The sharpened point B is provided for the purpose of extracting staples from the post, as shown in Fig. 3, and it may also be conveniently used for elevating the post from the ground as shown in dotted lines in the same figure.

Thus it will be seen that a very convenient tool is provided which may be used in various ways during the operation of fence building.

Having thus described my invention, what I claim, and desire to secure by Letters Patent, is—

An improved fencing tool comprising a bar having cylindrical portion A, a staple extracting point formed at its outer end and on one side of its longitudinal axis, collar C arranged at its inner end, bar portion D projected from the said collar and formed with an offset between its ends, a chisel at the outer edge of the said portion D, and a locking lever arranged adjacent to said offset, substantially as shown and described.

In testimony whereof I affix my signature in presence of two witnesses.

GEORGE WILLIAM BURNS.

Witnesses:
J. J. BUNDY,
J. R. RATHBONE.